United States Patent [19]

Farrell et al.

[11] Patent Number: 5,107,299

[45] Date of Patent: Apr. 21, 1992

[54] PRINTER JOB RECOVERY OF COMPLETE OR PARTIALLY COMPLETE JOBS IN AN ELECTRONIC REPROGRAPHIC PRINTING SYSTEM

[75] Inventors: Michael E. Farrell, Fairport; Carla J. Kinder, Ontario; Pedro R. Ortiz, Webster; John C. Austin, Rochester, all of N.Y.

[73] Assignee: Xerox Corporation, Stamford, Conn.

[21] Appl. No.: 590,529

[22] Filed: Sep. 28, 1990

[51] Int. Cl.⁵ .................................. G03G 15/00
[52] U.S. Cl. .................................. 355/207; 355/308; 358/296
[58] Field of Search .............. 355/206, 207, 200, 308, 355/309, 316; 358/296, 300; 364/478; 270/58

[56] References Cited

U.S. PATENT DOCUMENTS

| | | | |
|---|---|---|---|
| 4,163,897 | 8/1979 | Hubbard et al. | 355/207 X |
| 4,229,100 | 10/1980 | Travis | 355/77 |
| 4,327,993 | 5/1981 | Gauronski et al. | 355/207 |
| 4,383,277 | 5/1983 | Kabo | 358/296 X |
| 4,521,847 | 6/1985 | Ziehm et al. | 364/184 |
| 4,797,706 | 1/1989 | Sugishima et al. | 355/200 X |
| 5,044,619 | 9/1991 | Sundquist et al. | 270/58 |

Primary Examiner—Joan H. Pendegrass
Attorney, Agent, or Firm—Oliff & Berridge

[57] ABSTRACT

Printer job recovery for use in an electronic reprographic system includes the detection of faults affecting printer operation. If such a fault is detected, fault recovery is effected and operation continues. It is then determined whether the jobs are incomplete. If not, recovery is skipped and normal operation continues. If, however, it is determined that there are incomplete jobs, it is then determined whether there are any partially complete jobs. If not, normal system operation continues. Upon determination that there are partially complete jobs, the system recovers the oldest partially complete job. It is again determined whether there are any partially complete jobs. The cycle continues until it is determined that there are no partially complete jobs.

4 Claims, 13 Drawing Sheets

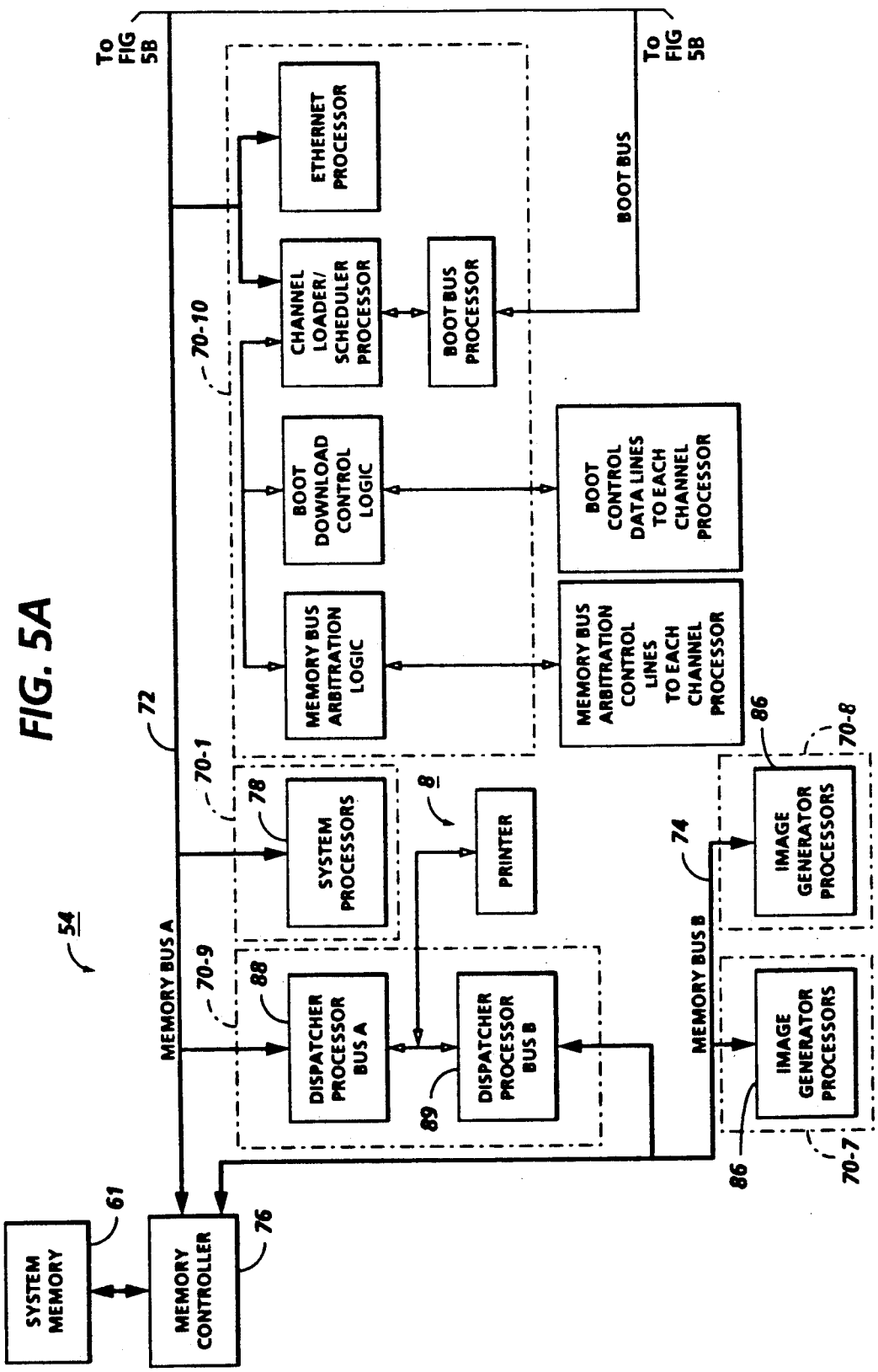

FIG. 7

PRINTER JOB RECOVERY OF COMPLETE OR PARTIALLY COMPLETE JOBS IN AN ELECTRONIC REPROGRAPHIC PRINTING SYSTEM

BACKGROUND OF THE INVENTION

1. Field of the Invention

The present invention relates to a system of electronic reprographics and, more particularly, to a system of electronic reprographics in which productivity is improved when printer job recovery is required.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner downtime.

For a variety of reasons, operation in an electronic reprographic system can be interrupted. This can be the result of a scanner or printer fault, hardware or software faults, paper misfeed, intentional interruption, memory loss, etc. Upon such an interruption resulting in failure to complete printing of all the jobs in the system, the system commonly may either remake all the jobs or remake all the partially complete jobs except the oldest partially complete job to ensure that all jobs are complete. The oldest partially complete job is the partially complete job which started printing before all other partially complete jobs. This significantly reduces the productivity of the system, increases sheet waste and provides redundant job output.

The related art has disclosed printing systems which provide job recovery when a system fault occurs.

U.S. Pat. No. 4,229,100 to Travis discloses an automatic copy recovery system wherein a jam of a copy set is detected and the copy set is recovered using three counters to keep track of the copy set. Each counter contains a number of copies which have passed a sensor attached to the counter. A method of correctly billing a user when a jam occurs is shown. A method of recovering from three separate job recovery situations is shown.

U.S. Pat. No. 4,521,847 to Ziehm et al discloses a control system for job recovery after a malfunction occurs wherein a method of job recovery of a second job during a job interrupt is shown. During the interrupt condition, the first interrupted jobs variables are stored in memory. When a fatal software fault occurs within copier, the current job's necessary parameters are stored in a memory until such time as the problem is fixed.

U.S. Pat. No. 4,327,993 to Gauronski et al discloses a method and apparatus for performing job recovery in a reproduction machine wherein a number of job recovery schemes are shown for various types of jobs. No mention is made of multiple partially complete job recovery.

While the related art recognizes that job recovery can be provided in a printing system, it does not recognize the problems associated with job recovery in a system where some jobs may be complete or partially complete before fault occurrence.

OBJECTS AND SUMMARY OF THE INVENTION

Accordingly, one object of the present invention is to provide an electronic reprographic system which provides printer job recovery for complete or partially complete jobs without reducing system productivity.

Another object of the present invention is to provide an electronic reprographic system which provides printer job recovery for complete or partially complete jobs which reduces sheet waste and redundant job output.

A further object of the present invention is to provide an electronic reprographic system which maintains job integrity.

To achieve the foregoing and other objects and advantages, and to overcome the shortcomings discussed above, an electronic reprographic system for printing a job is provided which performs printer job recovery of complete and partially complete jobs. When the jobs have been completed, the printer responsible for job recovery skips recovery for all completed jobs so that normal system operation can continue. When there are any incomplete jobs, the system determines whether there are any partially complete jobs. If so, the oldest partially complete job is recovered. If not, normal system operation continues. After the oldest partially complete job is recovered, the system again determines whether there are any partially complete jobs so that the oldest partially complete job can be recovered and so on.

BRIEF DESCRIPTION OF THE DRAWINGS

The invention will be described in detail with reference to the following drawings in which like reference numerals refer to like elements and wherein:

FIGS. 5A, 5B, and 5C comprise a schematic block diagram showing the major parts of the control section for the printing system shown in FIG. 1;

FIG. 7 is a view depicting an exemplary job programming ticket and job scorecard displayed on the User Interface (UI) touchscreen of the printing system shown in FIG. 1;

DETAILED DESCRIPTION OF THE PREFERRED EMBODIMENTS

A. The System

Figure 1:
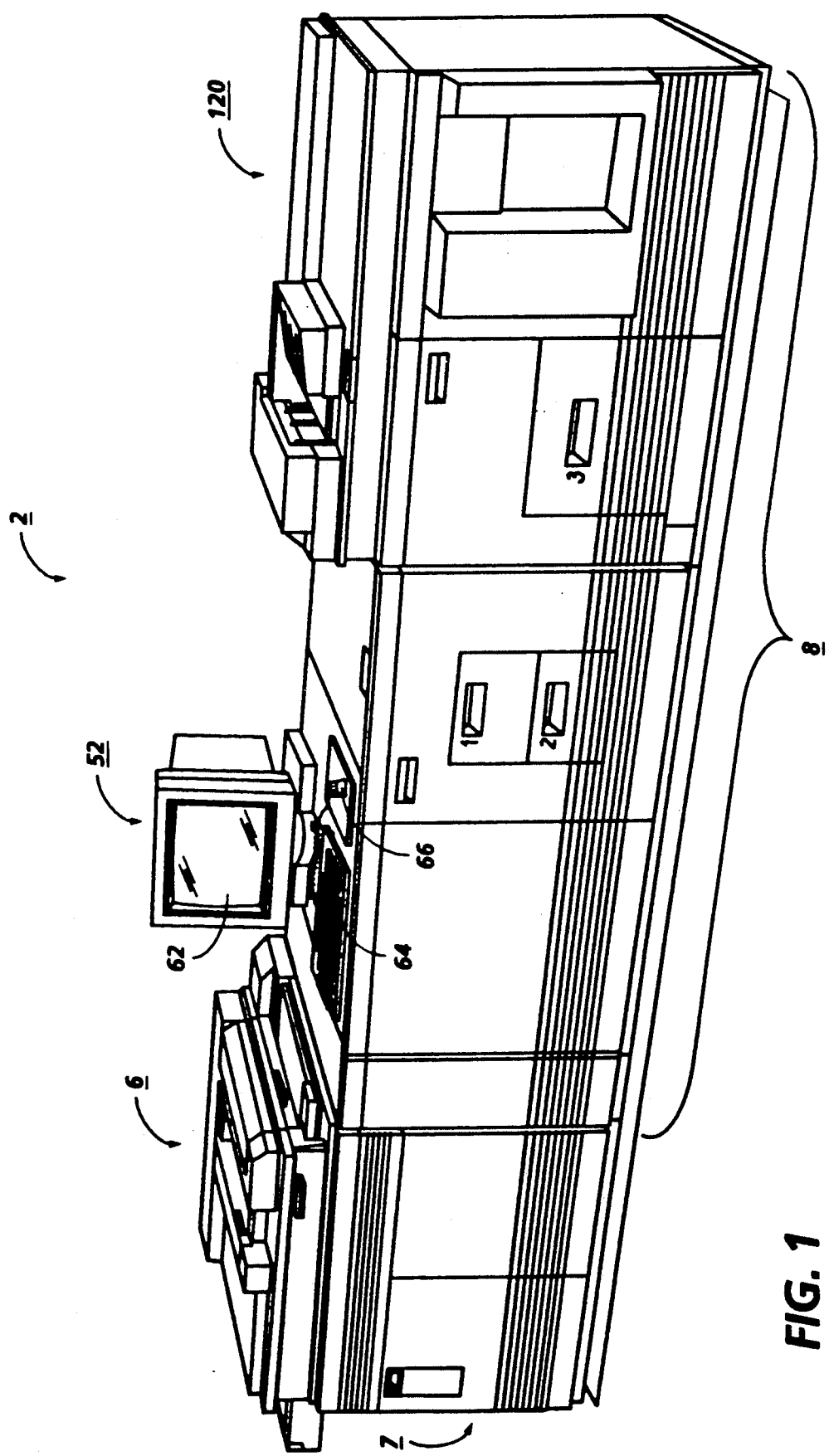
FIG. 1 is a view depicting an electronic printing system incorporating the printer job recovery features of the present invention.
Figure 2:
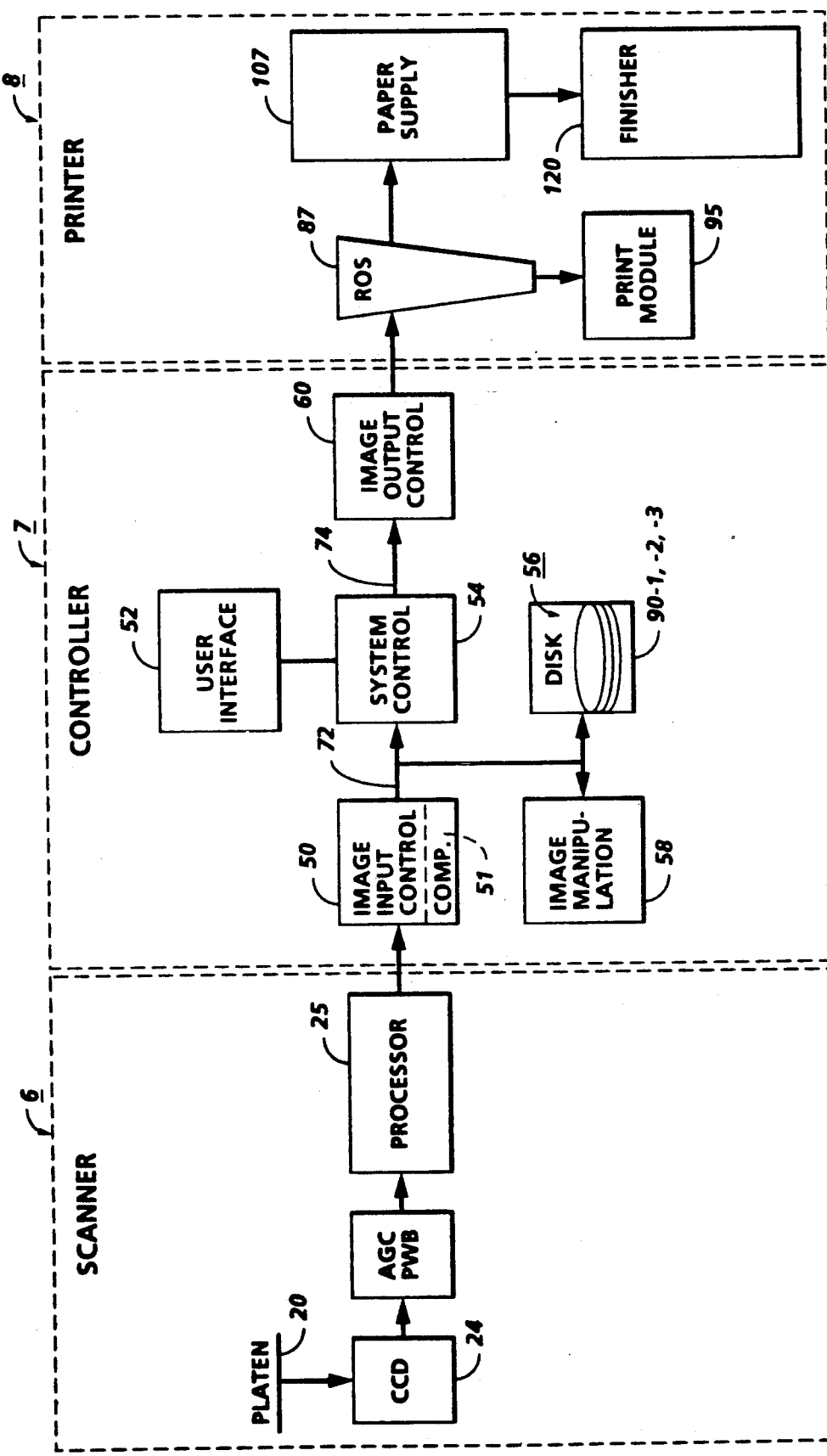
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
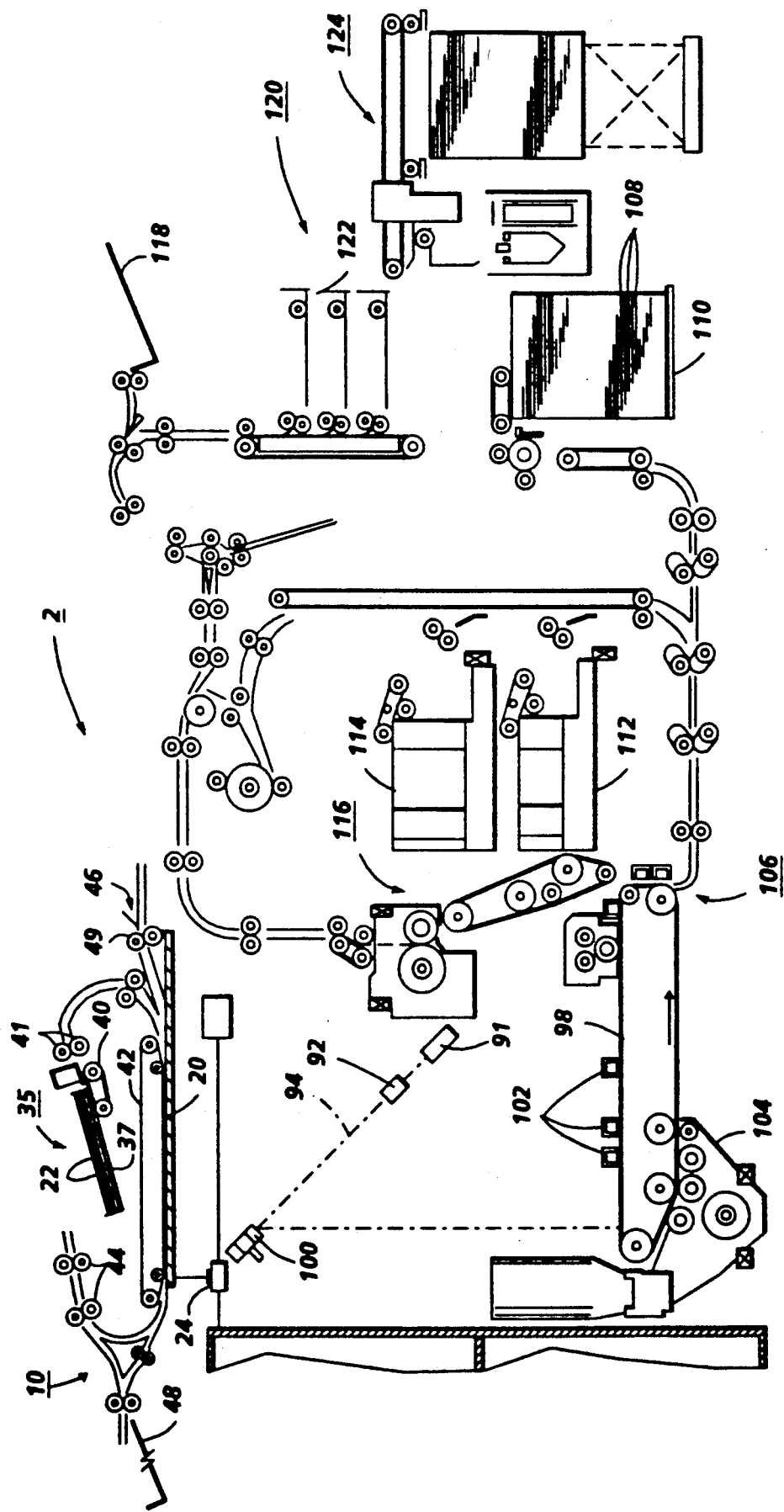
FIG. 3 is a plan view illustrating the principal mechanical components of the printing system shown in FIG. 1.
Figure 4:
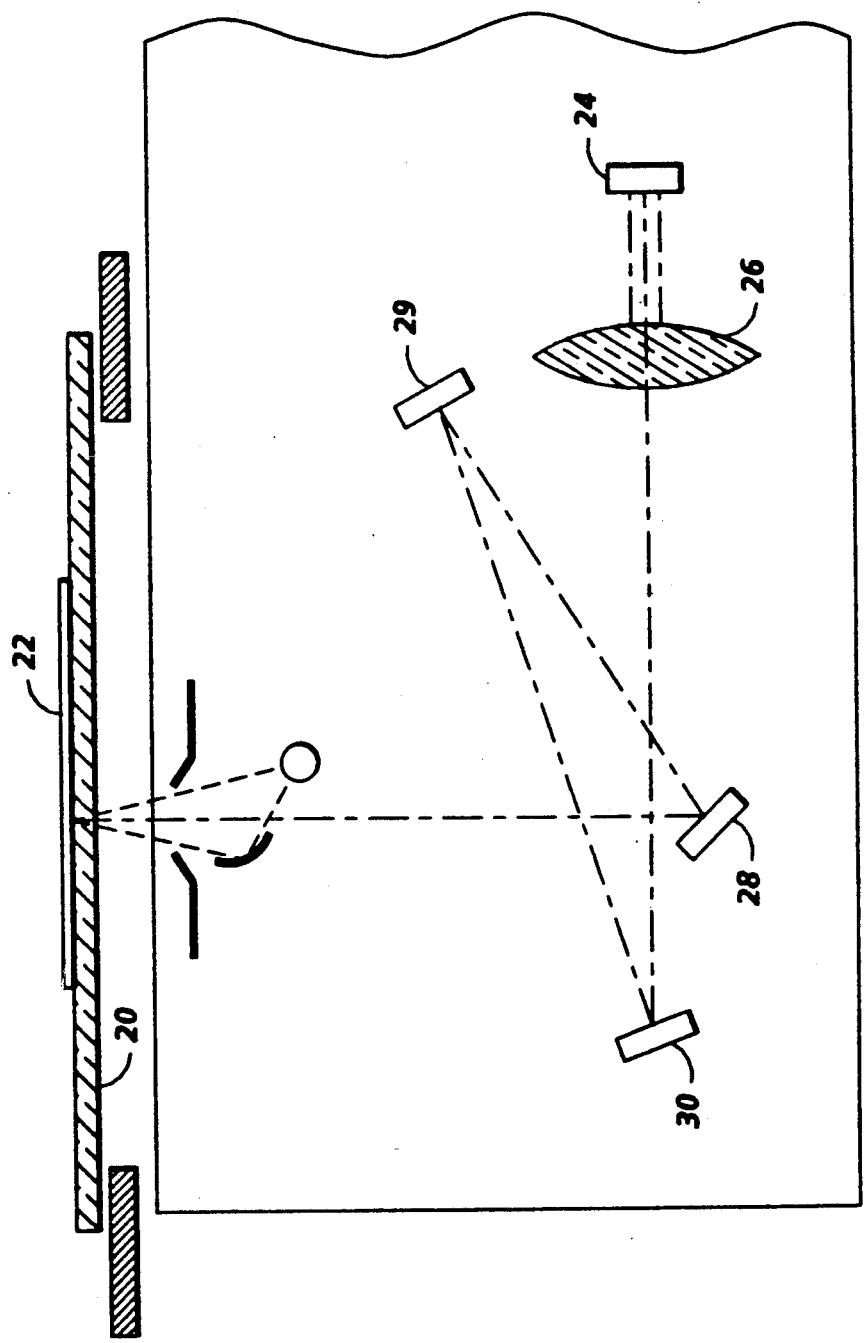
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5B:
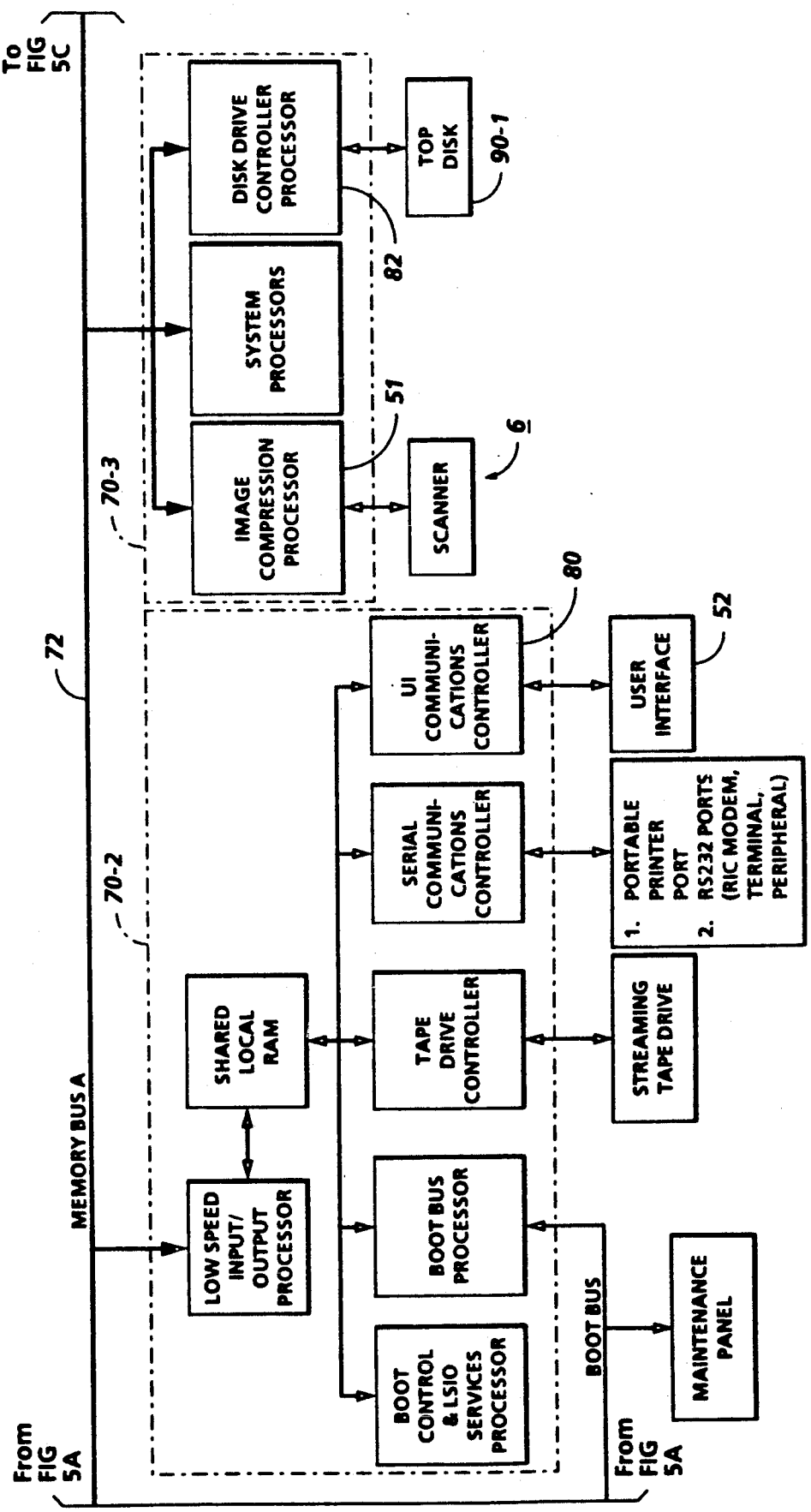
Figure 5C:
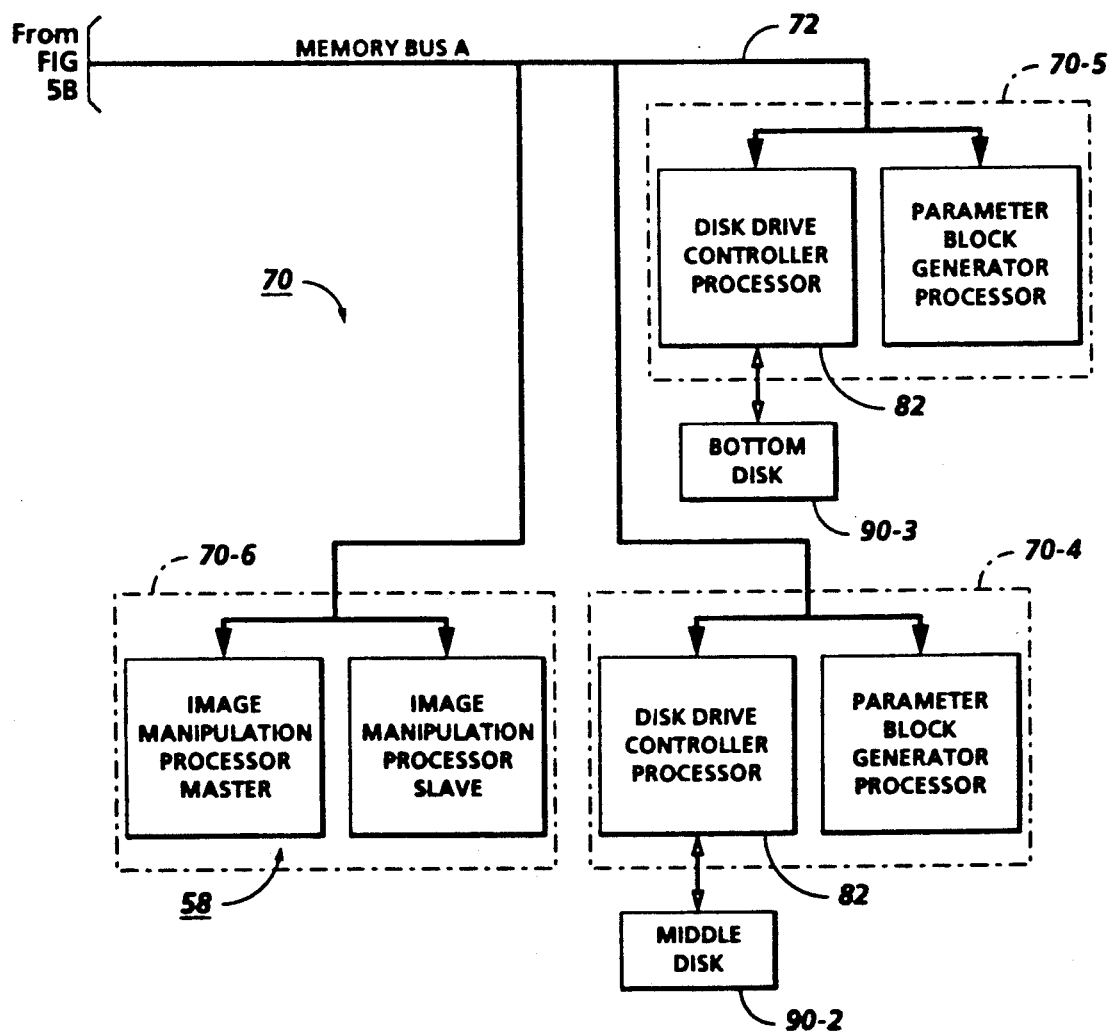

Referring particularly to FIGS. 5A-5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
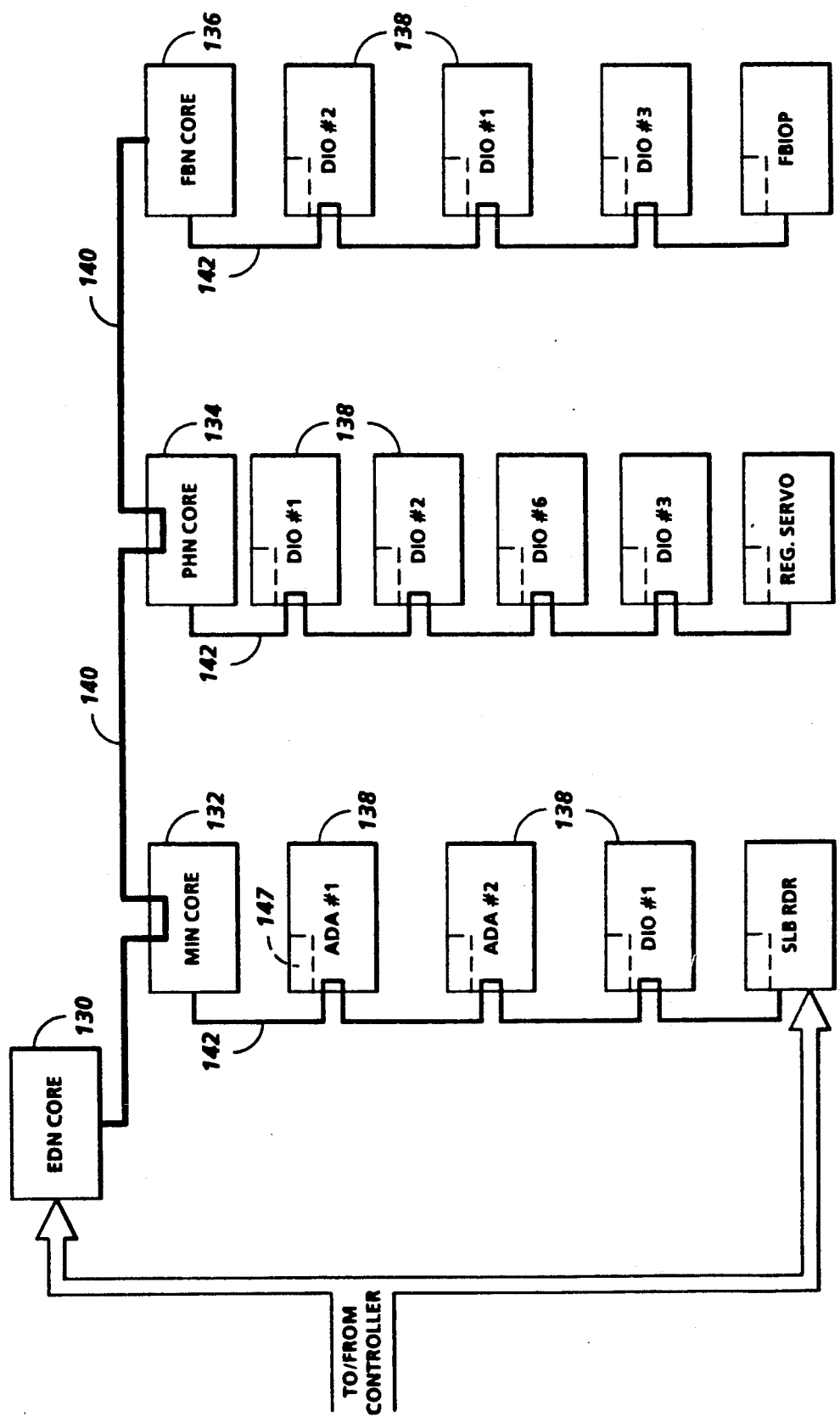
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
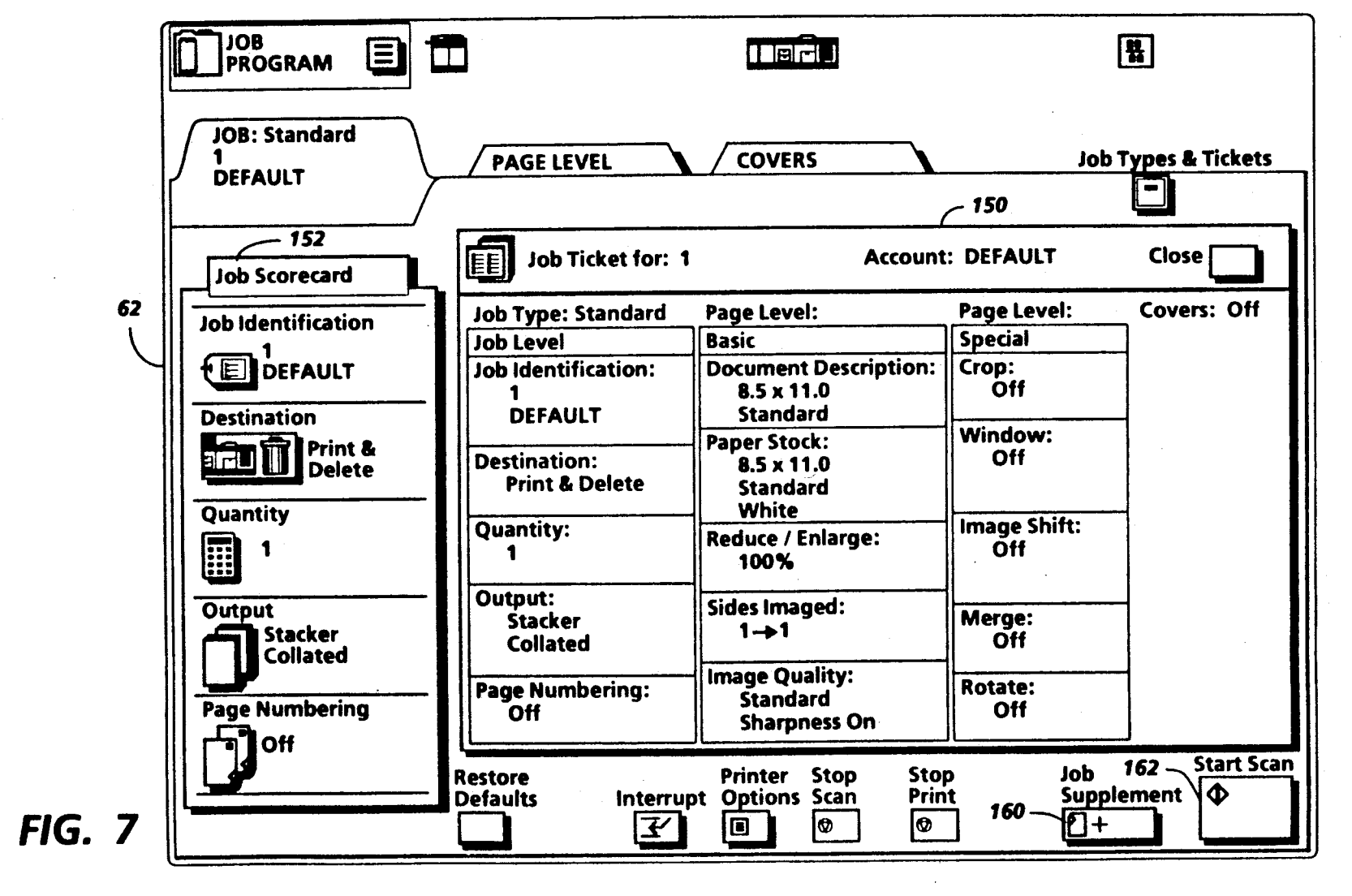

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Figure 8A:
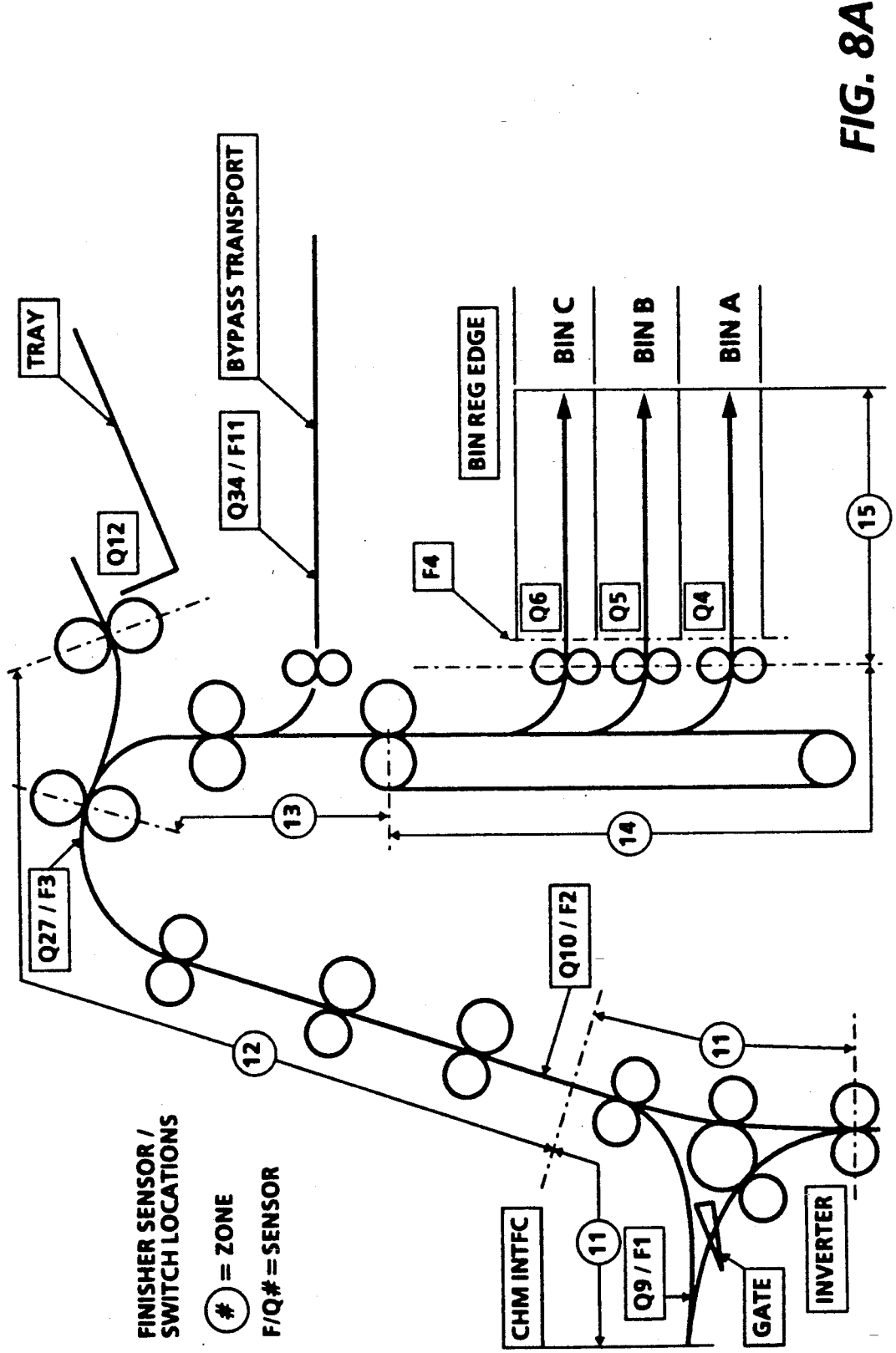
FIG. 8A and 8B are illustrations of exemplary sensor and switch locations in the finisher of the FIG. 1 system.
Figure 8B:
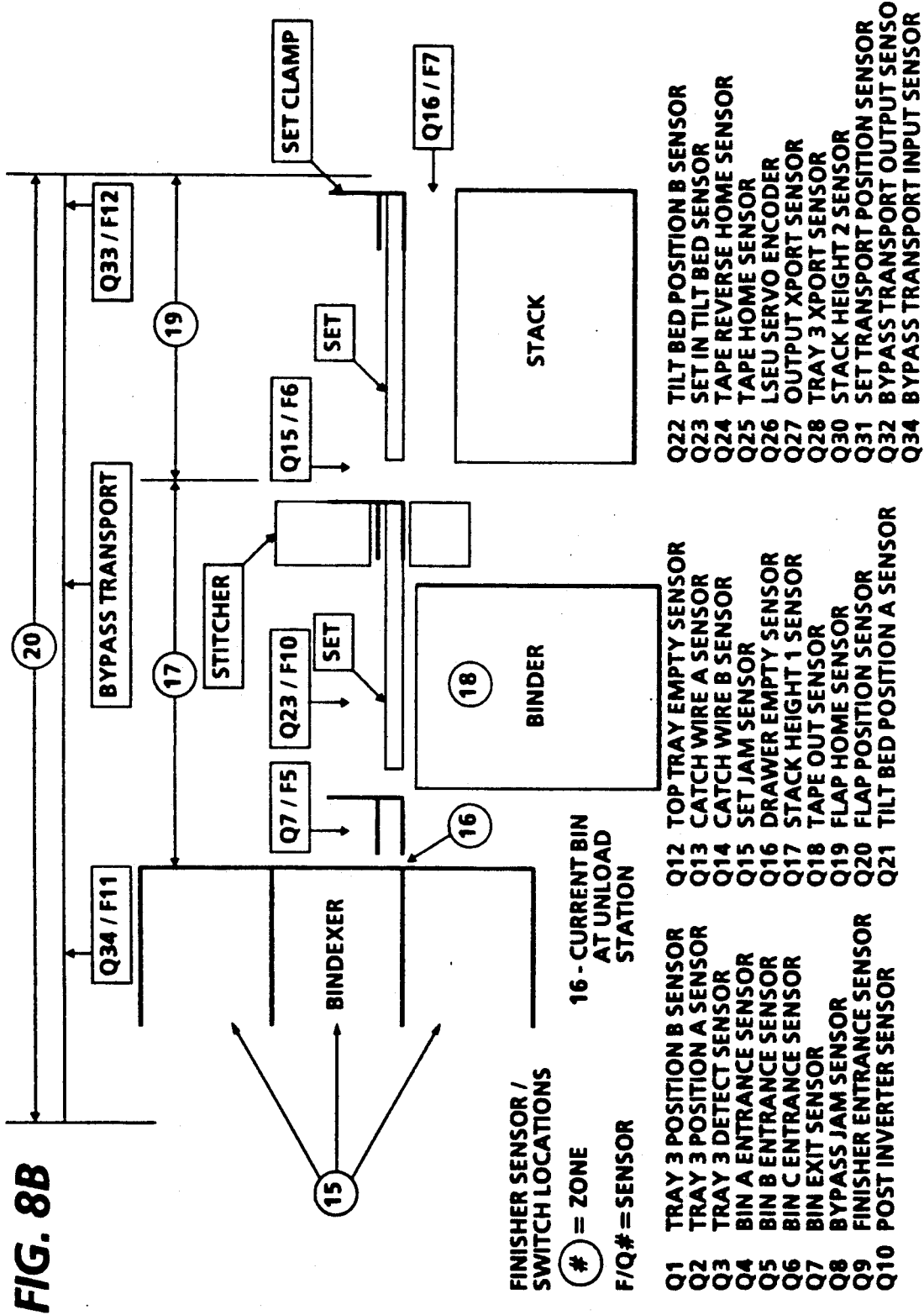

FIGS. 8A and 8B provide exemplary illustrations of sensor/switch locations provided in finisher 120 of system 2.

Figure 9:
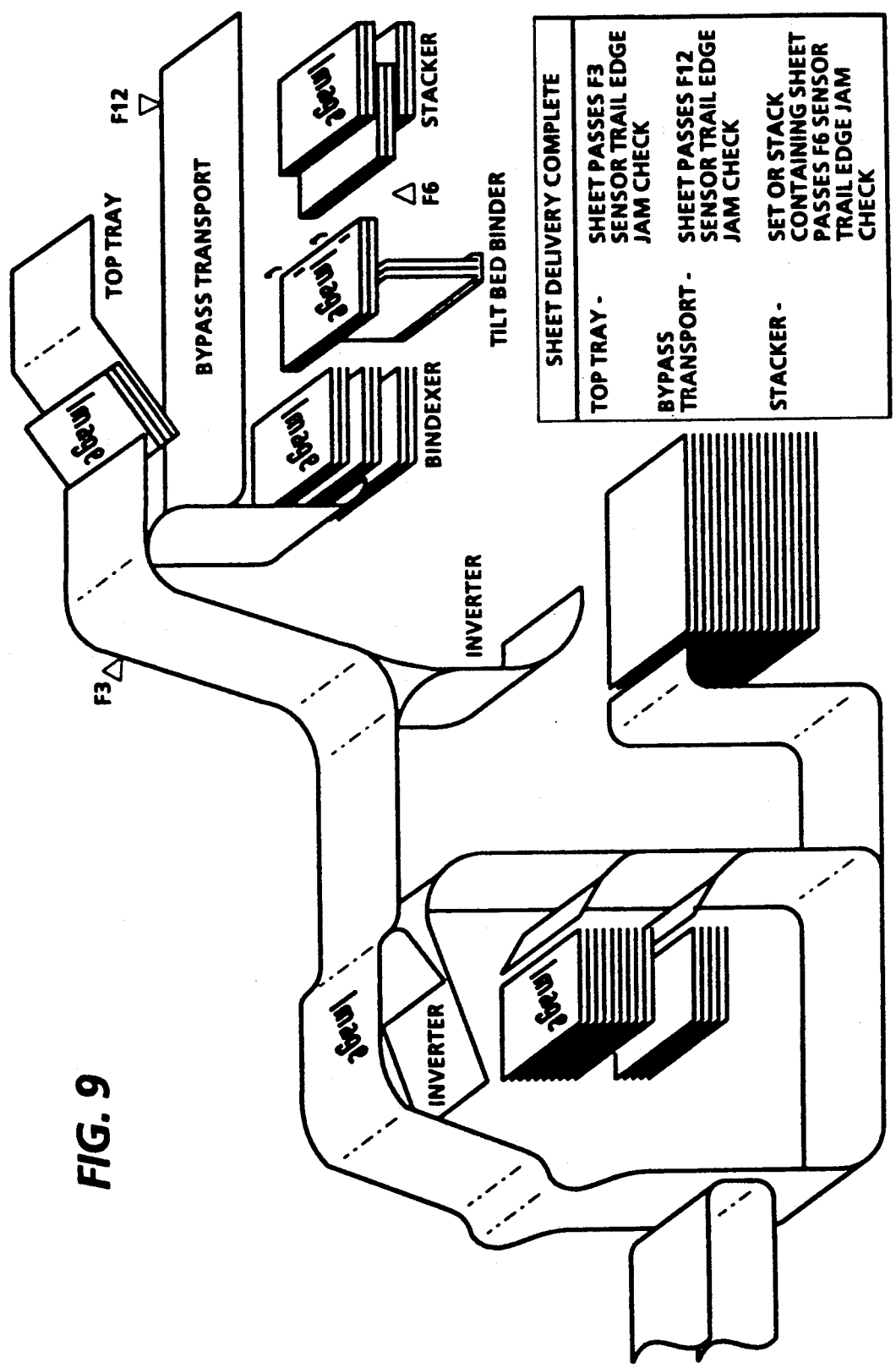
FIG. 9 is an illustration of exemplary sensor locations at which failure to complete printing of jobs is detected.

FIG. 9 illustrates exemplary locations at which it is detected whether sheet delivery has been completed to destinations within finisher 120.

B. Printer Job Recovery Operation

Figure 10:
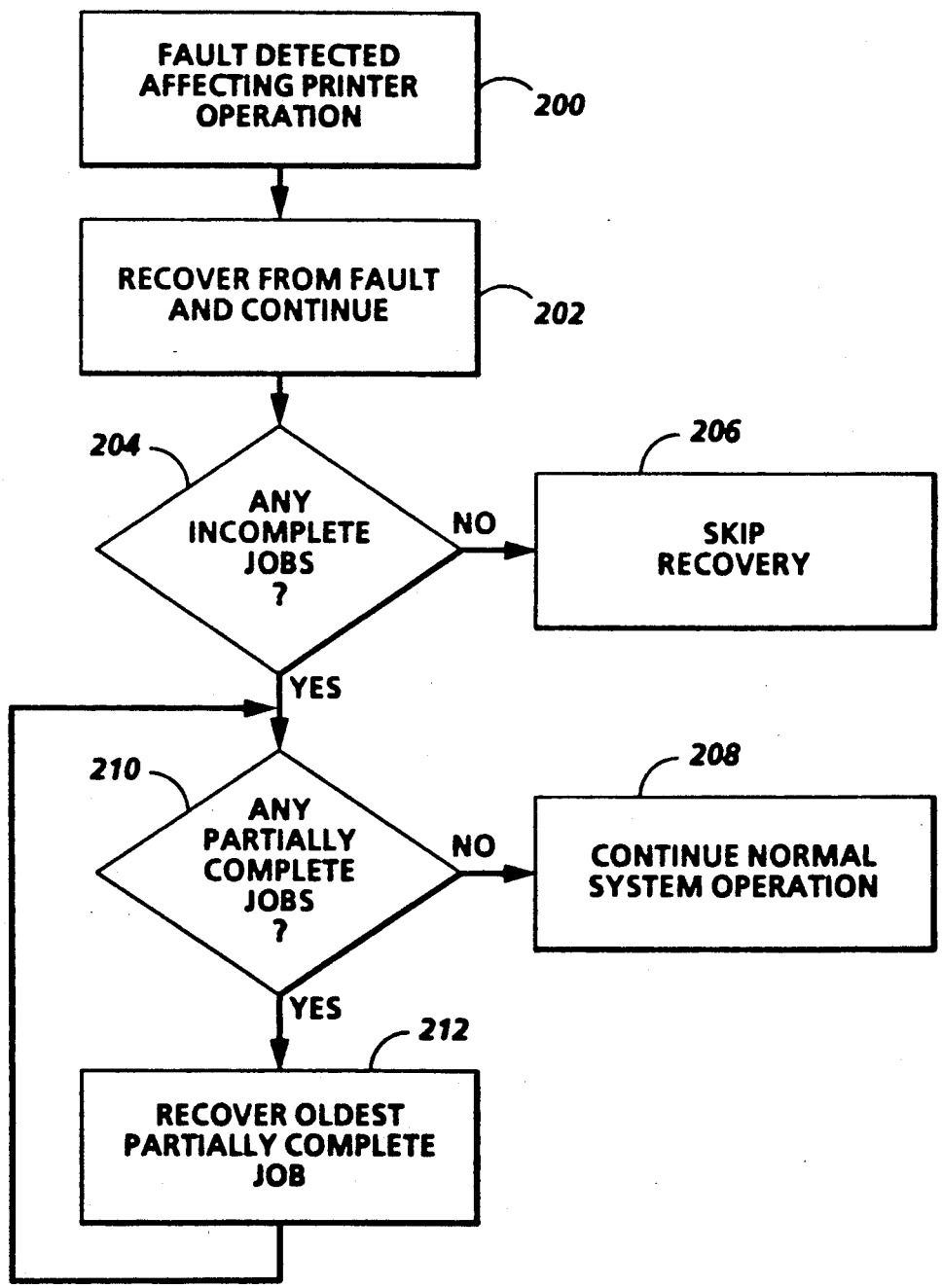
FIG. 10 is a flowchart depicting the printer job recovery operation of the FIG. 1 system according to the present invention.

Referring now to FIG. 10, there is shown a flowchart depicting the job recovery operation of system 2 according to the present invention. This job recovery can be used in electronic reprographic printers having the following attributes:

1) Advanced job streaming capability such that one job can be started before another job is complete;

2) Multiple job destinations, i.e. top tray, stacker and bypass transport; and

3) Unequal intervals between sheet scheduling and sheet delivery for the various job destinations, i.e. complete delivery of a sheet in a bound job may take up to 125 pitches longer than a top tray sheet.

According to the present invention, a fault affecting the operation of printer 8 is detected (step 200). Upon detection of such a fault, fault recovery is effected and operation continues (step 202). It is then determined whether any jobs are incomplete (step 204). If not, recovery is skipped (step 206) and normal system operation continues (step 208). If, however, it is determined that there are incomplete jobs, it is then determined whether there are any partially complete jobs (step 210). If not, normal system operation continues (step 208). Upon determination that there are partially complete jobs, the system recovers the oldest partially complete job (step 212). It is then again determined whether there are any partially complete jobs (step 210). The cycle continues from this stage of operation until it is determined that there are no partially complete jobs.

The above-described operation improves productivity in that all of the jobs are not required to be remade. Redundant job output is eliminated by the skipping of completed jobs and the recovery of partially completed jobs. There are no wasted sheets since job remake is no longer required.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of job recovery in an electronic reprographic system which prints a plurality of independent print jobs comprising the steps of:
   processing a plurality of independent print jobs;
   monitoring the system for the detection of a fault affecting printer operation;
   upon detection of such a fault, determining whether any of the plurality of jobs have not been completed;
   if determined that any of the plurality of jobs have not been completed, independently monitoring the status of all jobs;
   skipping recovery of any of the plurality of jobs which have been completed; and
   independently recovering one job per job destination for any partially completed job.

2. The method as recited in claim 1, wherein said steps are performed by a printer.

3. An apparatus for job recovery in an electronic reprographic system which prints a plurality of independent print jobs comprising:
   processing means for processing a plurality of independent print jobs;
   monitoring means for monitoring the system for the detection of a fault affecting operation of the system;
   determining means for determining whether any of the plurality of jobs have not been completed upon detection of such a fault;
   independent monitoring means for monitoring the status of all jobs if determined that any of the plurality of jobs have not been completed;
   skipping means for skipping recovery of any of the plurality of jobs which have been completed; and
   recovery means for independently recovering one job per job destination for any partially completed job.

4. The apparatus as recited in claim 3, wherein: said monitoring means, determining means, independent monitoring means, skipping means and recovery means re provided in a printer.

* * * * *